United States Patent
Havlir et al.

(10) Patent No.: US 11,500,692 B2
(45) Date of Patent: Nov. 15, 2022

(54) DYNAMIC BUFFERING CONTROL FOR COMPUTE WORK DISTRIBUTION

(71) Applicant: Apple Inc., Cupertino, CA (US)

(72) Inventors: Andrew M. Havlir, Orlando, FL (US); Benjamin Bowman, London (GB)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/021,720

(22) Filed: Sep. 15, 2020

(65) Prior Publication Data
US 2022/0083396 A1    Mar. 17, 2022

(51) Int. Cl.
*G06F 9/50*     (2006.01)
*G06T 1/60*     (2006.01)
*G06T 15/00*    (2011.01)

(52) U.S. Cl.
CPC .............. *G06F 9/5083* (2013.01); *G06T 1/60* (2013.01); *G06T 15/005* (2013.01)

(58) Field of Classification Search
CPC ........ G06F 9/5083; G06T 15/005; G06T 1/60
See application file for complete search history.

(56) References Cited

U.S. PATENT DOCUMENTS

| | | | |
|---|---|---|---|
| 6,694,388 B1 * | 2/2004 | Schzukin | ............ H04L 12/5601 710/52 |
| 10,002,081 B2 | 6/2018 | Guilford et al. | |
| 10,068,306 B2 | 9/2018 | Rao et al. | |
| 10,192,281 B2 | 1/2019 | Boles et al. | |
| 10,593,094 B1 | 3/2020 | Havlir et al. | |
| 10,664,942 B2 | 5/2020 | Paltashev et al. | |
| 11,010,862 B1 * | 5/2021 | Nijasure | ................ G06T 15/005 |
| 2014/0168245 A1 * | 6/2014 | Fahs | ....................... G06T 15/005 345/533 |
| 2017/0053374 A1 * | 2/2017 | Howes | ..................... G06F 8/441 |
| 2018/0300951 A1 * | 10/2018 | Surti | ..................... G06F 3/0484 |
| 2018/0322078 A1 * | 11/2018 | Qiu | ..................... G06F 12/0895 |
| 2019/0156528 A1 * | 5/2019 | Feeney | ............... G06F 3/04883 |

FOREIGN PATENT DOCUMENTS

JP        2004289805 A  * 10/2004  ............. H04L 12/28

* cited by examiner

*Primary Examiner* — Jacinta M Crawford
*Assistant Examiner* — Donna J. Ricks
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to dynamically adjusting buffering for distributing compute work in a graphics processor. In some embodiments, the graphics processor includes shader circuitry configured to process compute work from a compute kernel, multiple distributed workload parser circuits configured to send compute work to the shader circuitry, primary workload parser circuitry configured to send, via a communications fabric, compute work from the compute kernel to the distributed workload parser circuits, and buffer circuitry configured to buffer compute work received by one or more of the distributed workload parser circuits from the primary workload parser circuitry. In some embodiments, the graphics processor is configured to dynamically adjust a limit on the number of entries used in the buffer circuitry based on information indicating complexity of the compute kernel. This may advantageously maintain launch rates while reducing or avoiding workload imbalances, in some embodiments.

20 Claims, 10 Drawing Sheets

Buffer circuitry 500

Tail

Head

- Available physical entries: 4
- Buffer reduction: 2
- Available credits: 2

DYNAMIC BUFFERING CONTROL FOR COMPUTE WORK DISTRIBUTION

BACKGROUND

Technical Field

This disclosure relates generally to parallel processing and more particularly to distributing compute kernels to processing elements (e.g., GPU shader cores) in distributed architectures.

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Compute work is often specified as kernels that are multi-dimensional aggregations of compute workgroups. For example, a program executed by a central processing unit may use one or more compute kernels that are compiled for another processor such as a GPU or digital signal processor (DSP). One common kernel organization is a three-dimensional kernel that includes a number of workgroups in each of the x, y, and z dimensions. Fetching and distributing compute work efficiently may substantially affect performance and power consumption for compute tasks.

DETAILED DESCRIPTION

In disclosed embodiments, parser circuitry is distributed such that primary parser circuitry distributes compute work to distributed parser circuitry, which in turn distributes work to graphics shader circuitry. In some embodiments, compute work is buffered at each level of distribution. This may facilitate relatively high workgroup launch rates which may keep shader processors busy.

In some situations, however, buffering may result in workload imbalances if work is not completed at similar rates in distributed shaders. Therefore, in some embodiments, a graphics processor is configured to dynamically adjust buffering capabilities. The adjustment may be dynamic in the sense that different buffering strategies are implemented for different kernels of the same program, for example. For example, the processor may use a greater amount of buffering in certain situations (e.g., when work is being completed relatively faster) and a smaller amount of buffering in other situations (e.g., when work is being completely relatively slowly). In various embodiments, this may advantageously maintain fast launch rates for fast-running work while reducing or avoiding workload imbalances for other types of work.

In particular, in some embodiments, a compute control stream that specifies compute kernels also includes a field that indicates the complexity of a kernel. Based on this field, the processor may increase or decrease the usable size of one or more buffers for distributing work for that kernel.

Figure 1A:
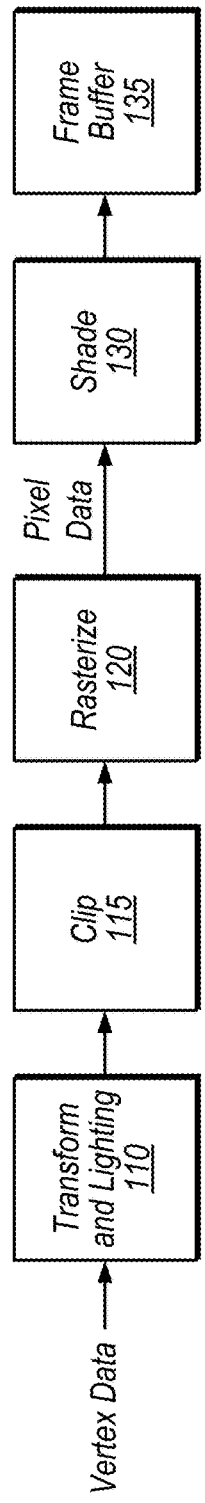
FIG. 1A is a diagram illustrating an overview of example graphics processing operations, according to some embodiments.
Figure 1B:
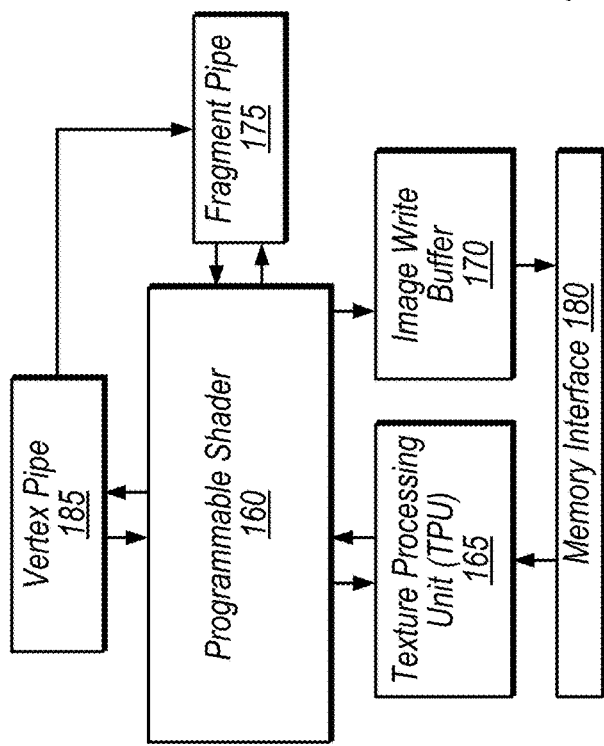
FIG. 1B is a block diagram illustrating an example graphics unit, according to some embodiments.
Figure 2:
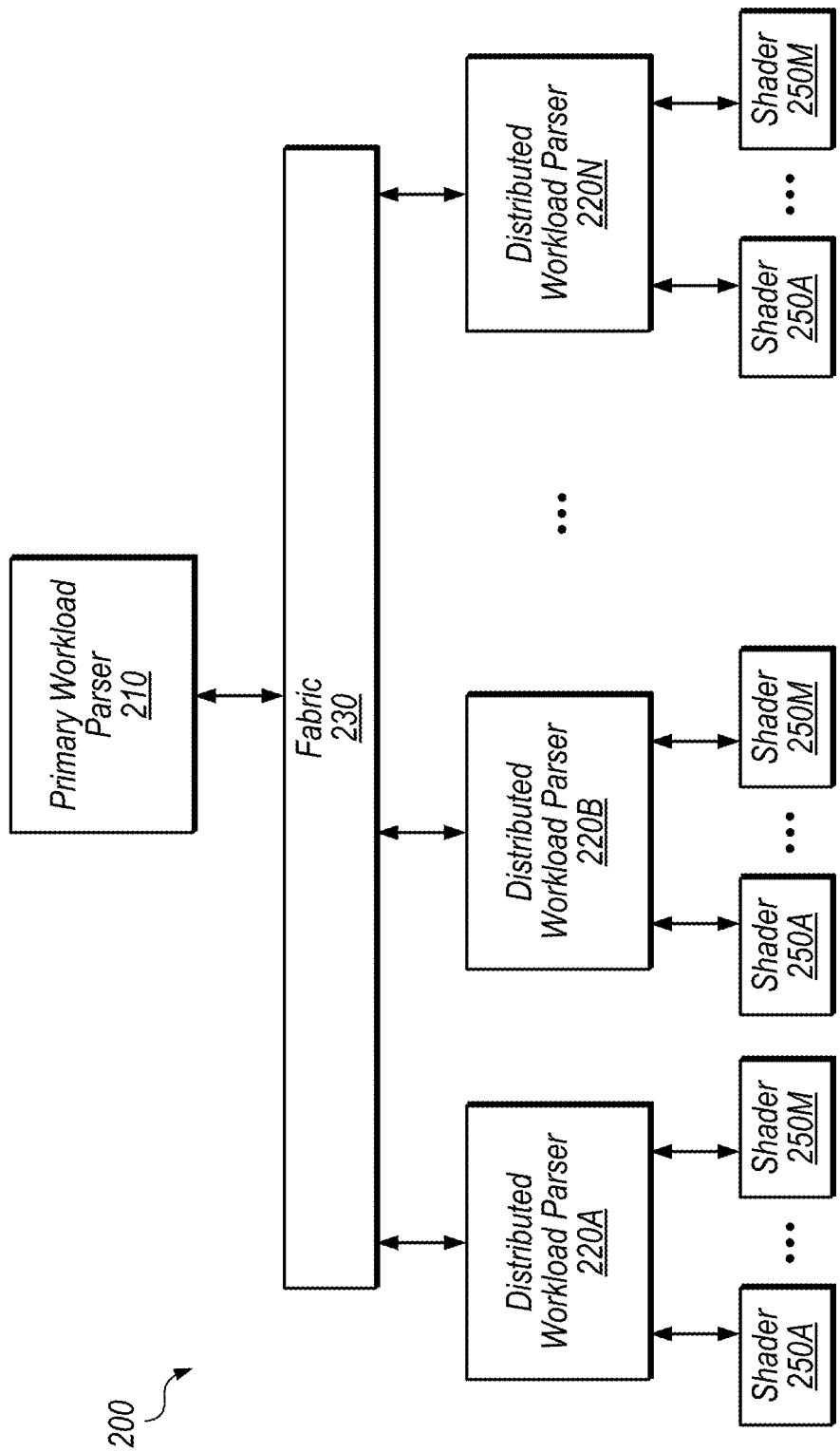
FIG. 2 is a block diagram illustrating an overview of a distributed hierarchical workload parser architecture, according to some embodiments.
Figure 8:
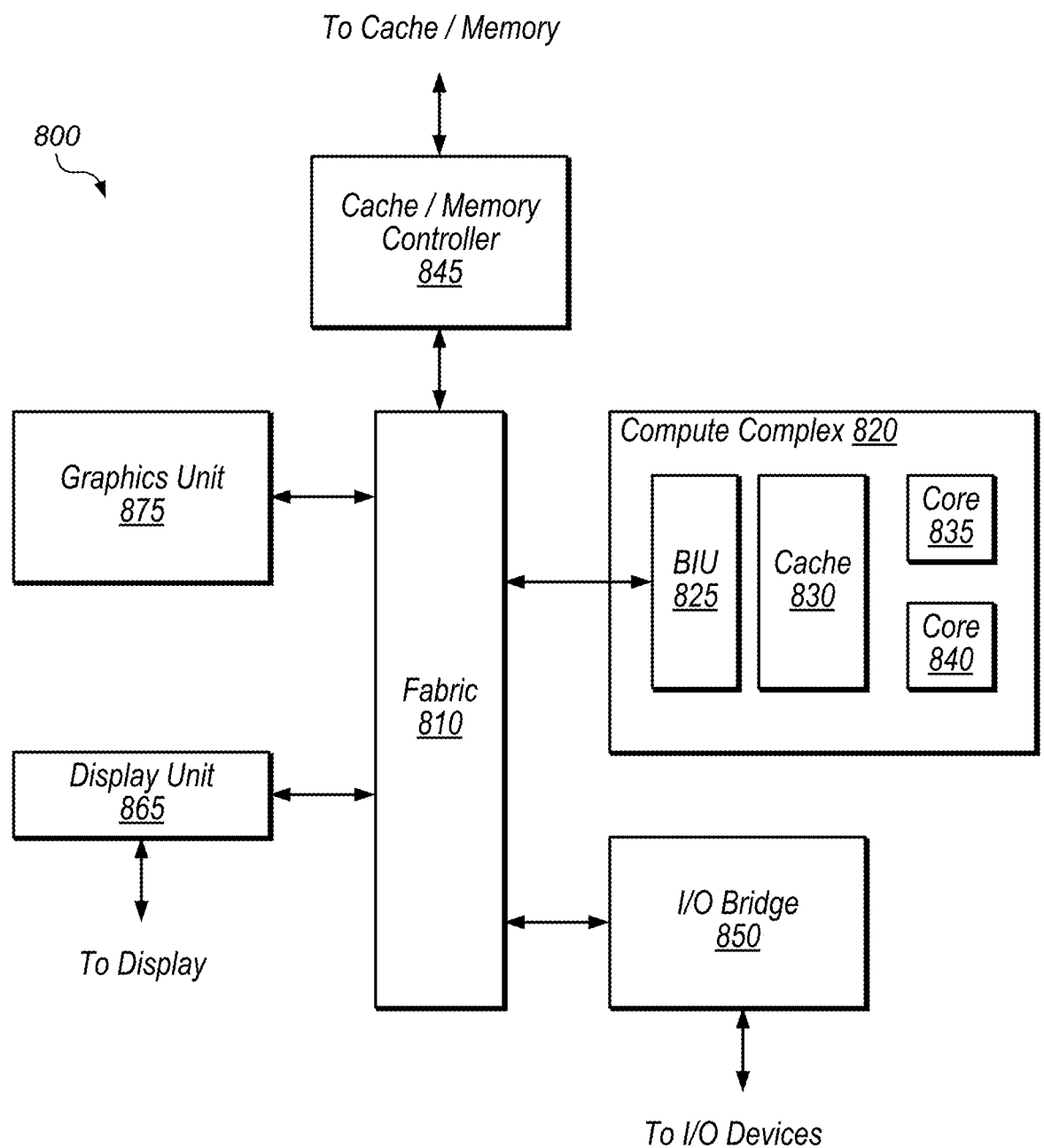
FIG. 8 is a block diagram illustrating an example computing device, according to some embodiments.
Figure 9:
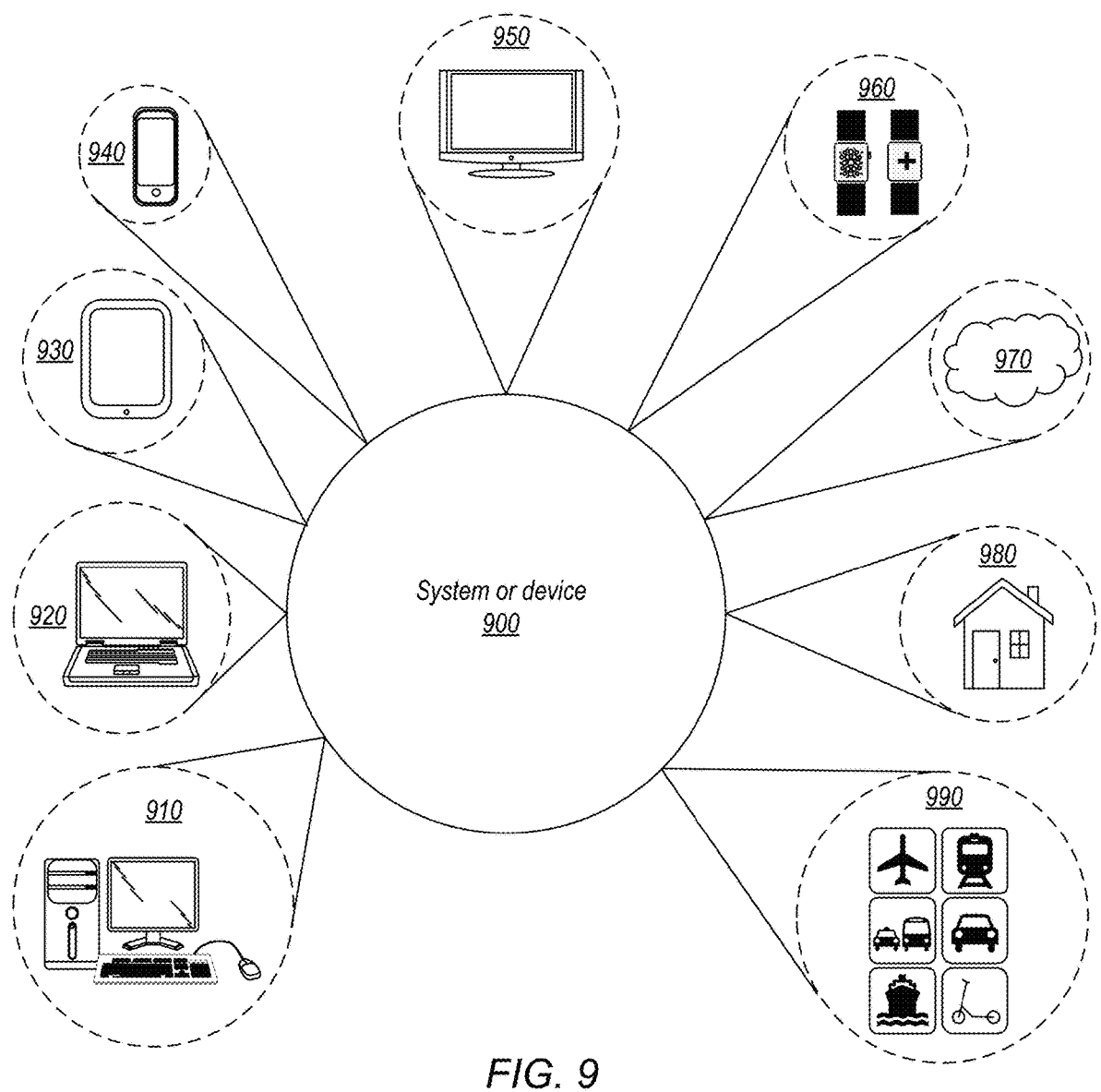
FIG. 9 is a diagram illustrating example applications of a computing system or device, according to some embodiments.
Figure 10:
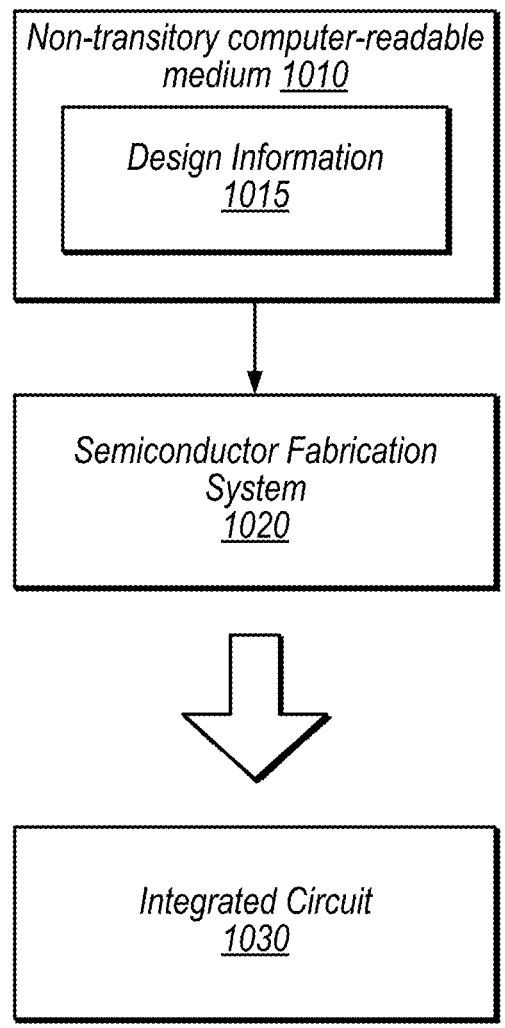
FIG. 10 is a block diagram illustrating an example computer-readable medium that stores circuit design information, according to some embodiments.

FIGS. 1A and 1B provide an overview of graphics processing. FIG. 2 provides example distributed parser circuitry while FIGS. 3A-7 provide example techniques for dynamic buffering adjustment. FIG. 8 provides an example device, FIG. 9 provides example applications of a computing system or device, and FIG. 10 provides an example computer-readable medium.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Parsing Compute Work

Compute work is generally specified in kernels that are multi-dimensional structures of workitems to be performed, e.g., by a GPU. As one example, a three-dimensional kernel may have a certain number of workitems in each of the x, y, and z dimensions. Workitems may be executed similarly to graphics threads. Kernels are often compiled routines for high throughput accelerators such as GPUs or DSPs. Kernels may be specified in their own programming language (e.g., OpenCL C), managed by a graphics API such as OpenGL, or embedded directly in application code (e.g., using C++ AMP). In some embodiments, workitems are aggregated into structures called workgroups. Thus, a kernel may also have a certain number of workgroups in each of the multiple dimensions. The term "workgroup" is intended to be construed according to its well-understood meaning, which includes a portion of the operations in a compute kernel. Typically, compute work is sent to a shader core at workgroup granularity. Each workgroup may include multiple workitems. A "shader core" or "shader unit" refers to a processing element configured to execute shader programs. Typically, a GPU includes a large number of shader units for parallel processing. In addition to pixel and vertex shading programs, for example, shader cores may also be used to execute compute programs. Note that, although shader cores and GPUs are discussed herein for purposes of illustration, the disclosed techniques are not limited to graphics processors, but may be applied to various parallel processor architectures.

In some embodiments, compute workload parser circuitry may iterate through a kernel to generate batches of workgroups. For example, the parser circuitry may generate the next coordinates for the next batch in multiple dimensions and downstream circuitry may use these dimensions to access the appropriate workgroups for execution. In some embodiments, a workgroup iterator is configured to determine coordinates for a new batch every clock cycle. In some embodiments, registers may store a limit for each of the dimensions based on the size of the kernel. For example, for a kernel that has three workgroups in the x direction, four in the y direction, and five in the z direction, these registers store corresponding values, in some embodiments (e.g., 2, 3, and 4 in embodiments that start counting at zero). In some embodiments, the limit value is used to determine when to rollover when incrementing a particular coordinate for a batch.

In some embodiments, GPUs are implemented using multiple subsets of circuitry that are coupled via a communications fabric. A "communications fabric," which may also be referred to as a "switch fabric" refers to circuitry with multiple ports that is configured to route input data at one of the ports to another one of the ports. Typically, all of the inputs of a communications fabric are connected to all of the outputs of the communications fabric. Further, switch fabrics typically include a number of physical lines connecting ports (directly or indirectly), resulting in a fabric-like appearance of the circuitry.

As one example, graphics unit 150 may include global control circuitry configured to send work to multiple programmable shaders 160 via a communications fabric. Note that the shaders may be configured to operate on multiple types of work (e.g., pixel work, vertex work, and compute work) and arbitration circuitry (not shown) may allocate a portion of available shader resources to compute work. This distributed architecture may allow efficient control with an increase in overall compute power, but may introduce challenges in efficiently distributing compute work to different shaders. For example, the distributed workload parsers may have reduced information available relative to a single centralized workload parser, but it may be desirable to avoid overburdening the communications fabric when transmitting parser information. Various techniques discussed herein facilitate efficient distribution of compute work in such distributed implementations.

FIG. 2 is a block diagram illustrating example circuitry with distributed workload parsers for different sets of shaders, according to some embodiments. In the illustrated embodiment, circuitry 200 includes global workload parser 210, distributed workload parsers 220A-N, fabric 230, and shaders 250. In some embodiments, the global workload parser is referred to as a primary workload parser or primary workload parser circuit. In the illustrated embodiment, the global workload parser 210 communicates with distributed workload parsers 220 via fabric 230. Each distributed workload parser 220 is configured to send compute work to the set of shaders 250 to which it is connected, in some embodiments. In some embodiments, each programmable shader 160 (or some other granularity of sub-GPU) includes a distributed workload parser 220. Parsers 210 and 220 may be included on the same integrated circuit along with fabric 230 or may be implemented on different integrated circuits.

Example Buffer Circuitry and Buffer Size Adjustment

Figure 3A:
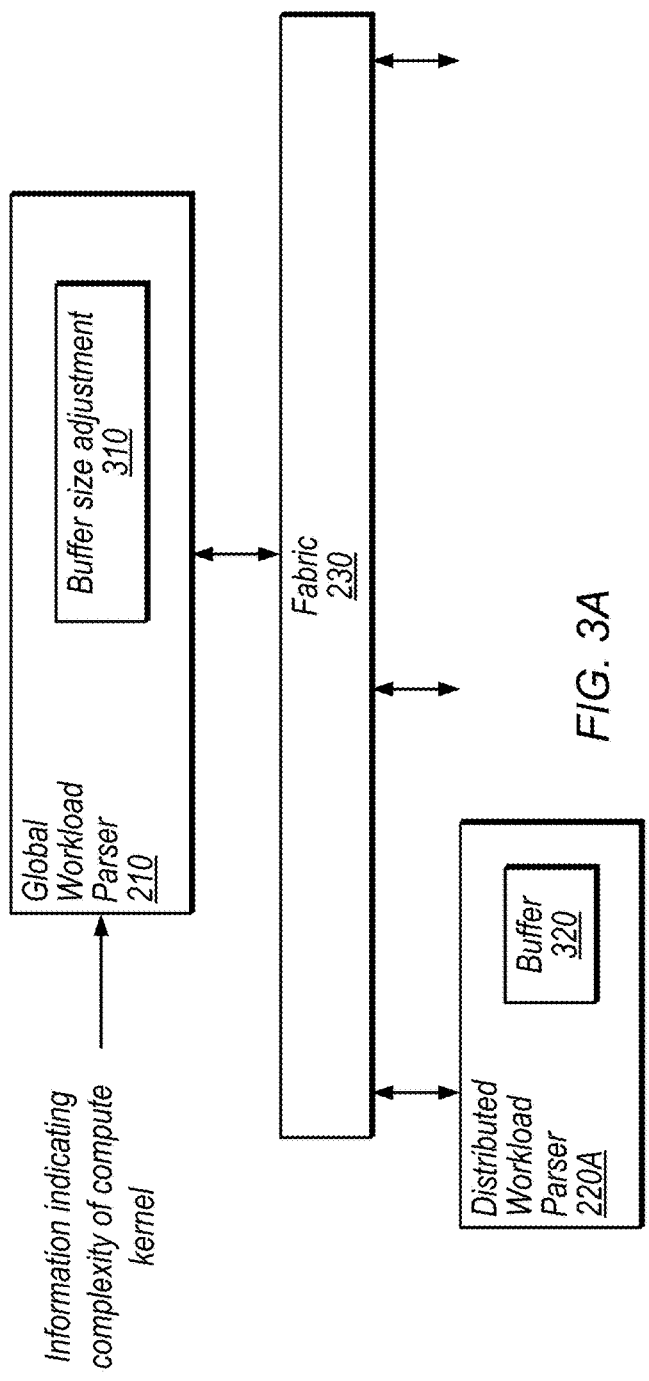
FIGS. 3A and 3B are block diagrams illustrating buffer circuitry at different levels, according to some embodiments.

FIG. 3A is a block diagram illustrating example buffer circuitry in a distributed workload parser, according to some embodiments. In the illustrated embodiment, global workload parser 210 includes buffer size adjustment circuitry 310 and distributed workload parser circuitry 220A includes buffer circuitry 320.

Buffer circuitry 320, in some embodiments, is configured to buffer compute work assigned to distributed workload parser circuitry 220A. Buffer circuitry 320 may include multiple entries configured to store batches of compute workgroups. Each batch may include workgroups in multiple dimensions (e.g., x, y, and z dimensions).

Buffer size adjustment circuitry 310, in some embodiments, is configured to dynamically adjust the amount of buffering performed by buffer circuitry 320 based on information indicating the complexity of a compute kernel. For example, in some embodiments global workload parser 210 maintains credit information indicating the number of available entries in buffer circuitry 320. Global workload parser 210 may decrement a count of available credits each time it sends a batch of workgroups to distributed workload parser 220A and increment the number of credits based on distributed workload parser 220A reporting batch completions. In some embodiments, when decreasing buffering, buffer size adjustment circuitry 310 is configured to reduce the number of available credits such that all of the physical entries of buffer circuitry 320 are not actually used at the same time. A more detailed example of this technique is discussed below with reference to FIG. 5.

In some embodiments, buffer size adjustment circuitry 310 includes one or more programmable registers that are adjustable by software to indicate a buffer size or buffer size adjustment. In some embodiments, buffer size adjustment circuitry 310 includes different registers corresponding to buffering at different levels in a hierarchical parsing system.

Figure 3B:
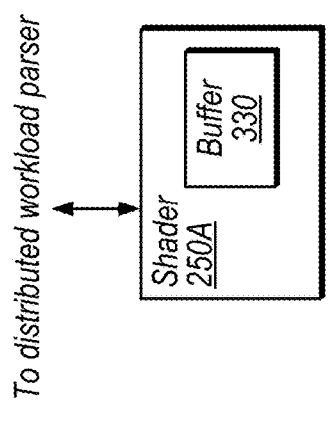

FIG. 3B is a block diagram illustrating example buffer circuitry for a shader, according to some embodiments. Note that buffer 330 may or may not be located within the shader. Buffer circuitry 330, in various embodiments, is configured to buffer compute work assigned to shader 250A. In some embodiments, buffer circuitry 330 includes multiple entries each configured to store a workgroup for dispatch to shader circuitry.

In some embodiments, buffer size adjustment circuitry 310 is configured to adjust the amount of buffering by buffer circuitry 330, e.g., using credit reduction or other techniques. In some embodiments, a portion of buffer size adjustment circuitry 310 is included in each distributed workload parser 220 and the compute workload parser 210 may send information via fabric 230 indicating the current desired amount of buffering by buffers 330. A distributed workload parser 220 may implement this amount of buffering for its corresponding buffers 330, e.g., using a credit system.

Figure 4:
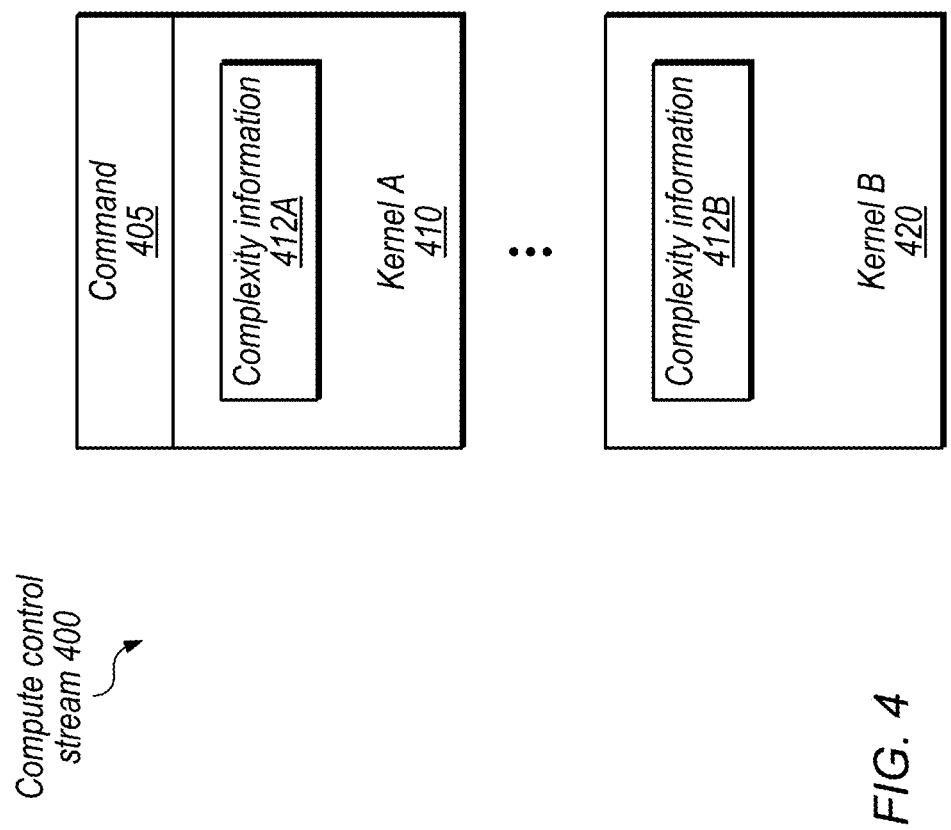
FIG. 4 is a diagram illustrating an example compute control stream, according to some embodiments.

FIG. 4 is a diagram illustrating an example compute control stream, according to some embodiments. Compute control stream 400, in the illustrated embodiment, includes a command 405 and two kernels 410 and 420. In the illustrated example, each kernel includes complexity information (field 412A for kernel A and field 412B for kernel B).

In some embodiments, the complexity field is generated by a compiler. The field may be a binary field, e.g., to indicate complex or non-complex kernels. In other embodiments, the complexity may be indicated at various granularities with various numbers of different values. In some embodiments, buffer size adjustment circuitry 310 is configured to adjust the amount of buffering when processing a given kernel based on the value of its complexity field. For example, for a complexity field that supports four discrete values, the control circuitry may support four corresponding number of levels of buffering. In other embodiments, a given hardware implementation may use the same amount of buffering for multiple complexity values. Further, control circuitry may adjust buffering based on other inputs in conjunction with complexity information.

Figure 5:
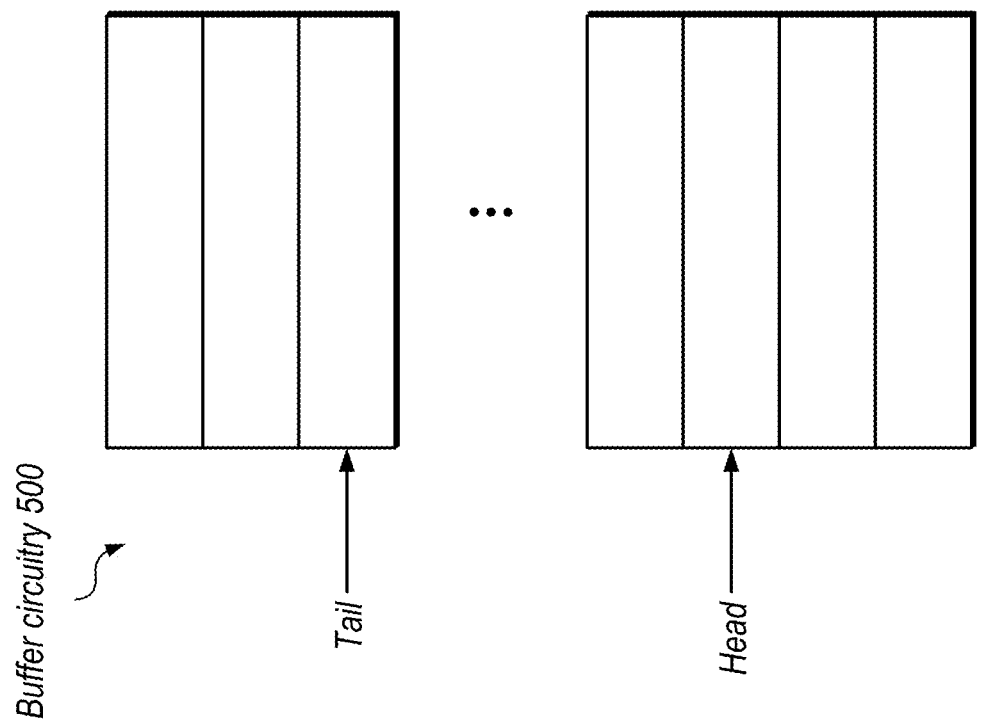
FIG. 5 is a diagram illustrating example buffer circuitry and credit data, according to some embodiments.

FIG. 5 is a diagram illustrating example ring buffer circuitry and credit-based reduction in buffering. In the illustrated embodiment, buffer circuitry 500 is a ring first in first out (FIFO) buffer with a head pointer and a tail pointer. The tail pointer may be updated each time the oldest entry is accessed and the head pointer updated each time a new entry is added.

In the illustrated example, there are four entries available in buffer circuitry 500. In this example, buffer size adjustment circuitry 310 has determined to reduce the buffering entries by 2. Therefore, in this example, there are only two credits available to workload parser circuitry to send additional work to buffer circuitry 500. This reduction in buffering may advantageously reduce workload imbalances, in some embodiments, for more complex kernels. For example, if buffer circuitry 500 is a workload buffer in a shader, complex workgroups filling the buffer circuitry may take a long time to complete while other shaders may be idle. Reducing the buffering may reduce or avoid this situation. Generally, using less buffering for longer-running work may improve load balancing at the tail of distribution for a given kernel by avoiding situations where one buffer is overfilled compared with another when there are bursts of work completions in those buffers.

Note that the embodiment of FIG. 5 is included for purposes of explanation but is not intended to limit the scope of the present disclosure. For example, in other embodiments any of various appropriate types of buffer circuitry and techniques for tracking available buffer space may be implemented.

Detailed Example Distributed Parser Circuitry

Figure 6:
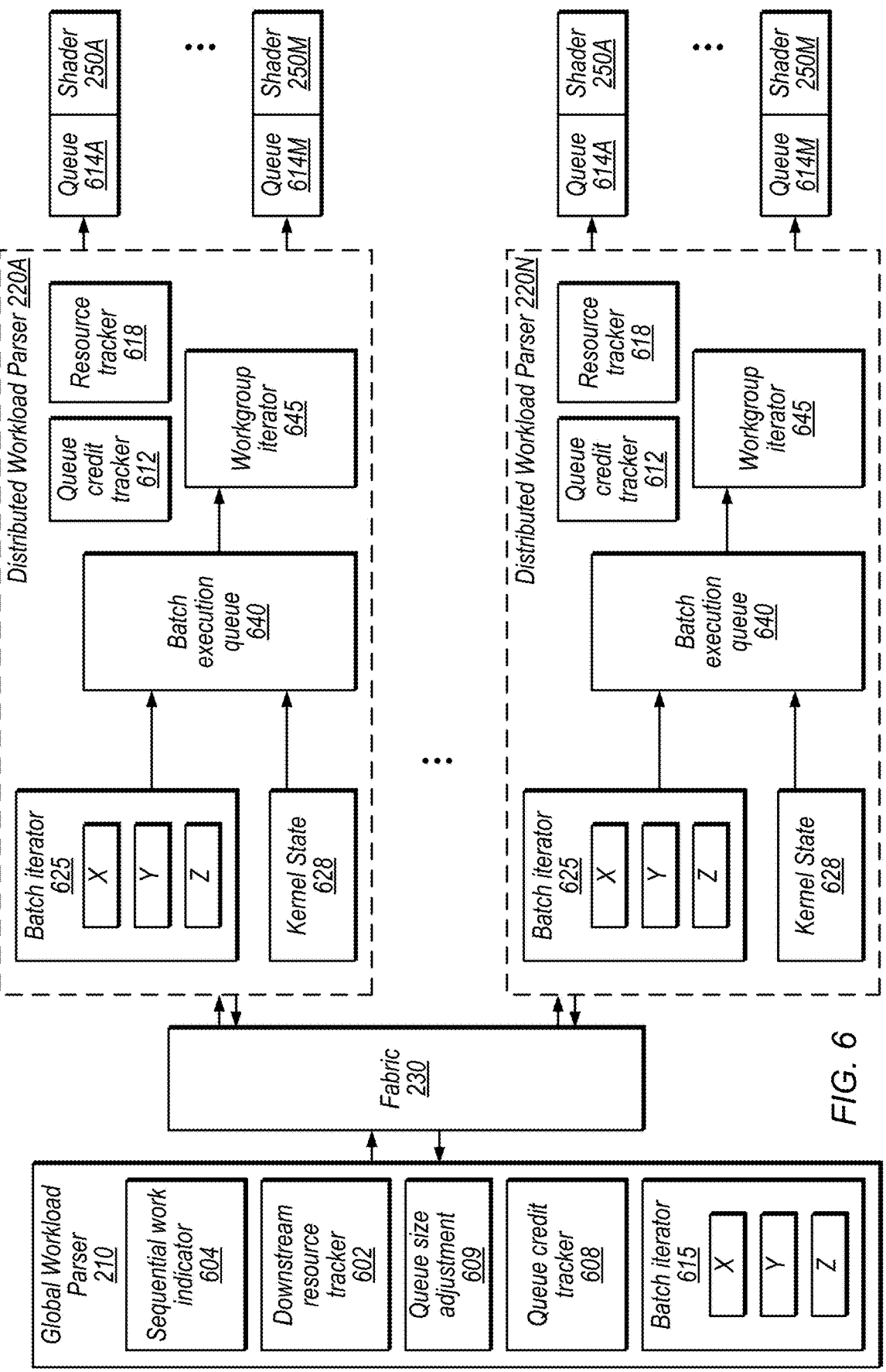
FIG. 6 is a block diagram illustrating example circuitry included in global and distributed workload parsers, according to some embodiments.

FIG. 6 is detailed a block diagram illustrating example distributed workload parser circuitry, according to some embodiments. The illustrated example provides example implementations of global workload parser 210 and distributed workload parsers 220.

Global workload parser 210, in the illustrated embodiment, includes sequential work indicator 604, downstream resource tracker 602, queue size adjustment circuitry 609, queue credit tracker 608, and batch iterator 615.

Each distributed workload parser 220, in the illustrated embodiment, includes a batch iterator 625, kernel state information 628, batch execution queue 640, queue credit tracker 612, resource tracker 618, and workgroup iterator 645.

In some embodiments, the batch iterators 615 and 625 are configured to maintain the coordinates of the current batch of workgroups. In some embodiments, this coordinate information may be used to retrieve information needed to execute workgroups from the batch.

In some embodiments, parsers 220 are configured to store batches in complete form (which may be generated based on the batch iterator coordinates and kernel state 628) in a batch execution queue 640 such that they are insulated and independent from other parts of the processing pipeline. Batch execution queue 640 is one example of buffer circuitry 320. Workgroup iterator 645, in the illustrated embodiment, is configured to retrieve batches from batch execution queue 640 and apportion workgroups from retrieved batches among shaders 250A-M for that parser 220. Thus, in some embodiments, batches are generated globally and distributed to different distributed parsers, which in turn distribute workgroups from their received batches.

In some embodiments, to begin processing a kernel, the global workload parser 210 send a kernel start command to all the distributed workload parsers. This command may include kernel state data that is valid over the entire kernel (e.g., this information may be static during execution, in contrast to dynamic state that may change based on kernel execution). Each distributed parser 220 may save this state information, e.g., in kernel state storage 628. Each distributed parser 220 may also set its batch iterator coordinates to an initial state (e.g., zeros for each coordinate).

After sending the kernel start command, in some embodiments the global workload parser iterates through the kernel. In some embodiments, this iteration generates a next batch of workgroups from the kernel each cycle, and the global workload parser 210 sends information for the current batch via fabric 230 each cycle (e.g., using a batch command). The batch command may indicate the size of the batch and which distributed workload parser is responsible for executing the batch. In some embodiments, the size of the batch is adjustable and may be selected, for example, from among a pre-determined range of value. The size of the batch may be dynamically adjusted from cycle to cycle for load balancing, for example.

When a distributed workload parser 220 receives a batch command for which it is not responsible, in some embodiments it is configured to update its coordinate state using its batch iterator 625. For example, based on the indicated size of the batch, the batch iterator 625 may determine the next coordinates in multiple dimensions. In some embodiments, sending the size of the batch may reduce traffic over fabric 230, relative to sending actual batch coordinates. In other embodiments, the next coordinates may be explicitly indicated or encoded using other techniques. If a distributed workload parser 220 is responsible for a received batch, in some embodiments it both writes the batch to batch execution queue 640 and updates its coordinate state.

The distributed workload parsers 220, in the illustrated embodiment, are configured to retrieve batches from their respective batch execution queues 640 and iterate through the batches to send workgroups to shader cores. A single workgroup or multiple workgroups from a given batch may be sent to each shader. The workgroup iterator 645 may store coordinates (not shown) for iteration within the current batch.

After sending the last batch, in some embodiments, global workload parser 210 sends a kernel terminate command to all the distributed workload parsers 220. In some embodiments, the distributed workload parsers 220 write this command to their respective queues 640. In some embodiments, the distributed workload parsers 220 are configured to send a kernel terminate indication to shaders 250 based on this command. In some embodiments, the distributed workload parsers 220 send the kernel terminate indication only to shader cores that received workgroups from the current kernel. In these embodiments, the workgroup iterator 645 may maintain control information indicating which shaders received workgroups.

In some embodiments, upon completing received work for a kernel (e.g., upon completion of each workgroup or kernel terminate), a shader 250 is configured to send a completion indicator to its distributed workload parser 220, which in turn informs global workload parser 210 via fabric 230. Note that, because the global workload parser 210 does not have knowledge of shader activity, in embodiments in which the distributed workload parser 220 only sends kernel terminates to shaders that received work for the kernel, it must also send completion indicators for shaders that did not receive work. When the global workload parser 210 receives the expected number of completion indicators, kernel execution is complete, in some embodiments.

Therefore, in some embodiments, kernel starts, kernel terminates, workgroup completions, batch assignments, and kernel terminate completions may be sent via fabric 230 while workgroups, kernel terminates, workgroup completions, and kernel terminate completions may be communicated between distributed parsers 220 and respective sets of shaders 250.

Note that, although various example embodiments herein have two hierarchical layers of parsers (e.g., a primary workload parser and distributed workload parsers), the disclosed techniques and circuitry may be utilized in parser implementations with various numbers of levels. For example, an intermediate level of distributed parsers may communicate with a primary workload parser and lower-level distributed workload parsers using the disclosed techniques. Parsers on a given level may communicate with parsers on multiple other levels using the same communication fabric or different communication fabrics.

In some embodiments, batches and kernel terminate commands are sent using a credited queue mechanism. Note that kernel start and non-executed batches may not require queue space, which may save area by reducing required queue size. In some embodiments, global workload parser 210 is configured to implement the credited queue mechanism such that batches are not allowed to take the last queue space of a distributed workload parser 220. In some embodiments, this may avoid stalling on a kernel terminate command, which needs a queue space in all distributed workload parsers. In some embodiments, global workload parser 210 uses queue credit tracker 608 to track the available queue space in each distributed parser 220. For example, a counter for each parser 220 may be decremented when sending an item to that parser's queue and incremented each time that parser reports completion of an item.

Downstream resource tracker 602, in the illustrated embodiment, is configured to maintain information indicating the resources available in each distributed parser 220. In some embodiments, global workload parser 210 is configured to select a distributed parser 220 for the next batch distributed based on the tracked resources. For example, global workload parser 210 may selected the distributed parser 220 that has the least amount of outstanding work (e.g., workitems that have been assigned but not completed).

Sequential work indicator 604, in some embodiments, specifies that multiple workgroups or batches should be sent sequentially to the same distributed parser 220. For example, sequential work indicator 604 may be set to facilitate efficient cache access, which may be adversely affected if workgroups are distributed at fine granularity. Sequential work indicators may be fixed or may be adjustable (e.g., by software). A sequential work indicator may by dynamically changed during execution of a kernel. In some embodiments, the sequential work indicator is set by software based on profiling of cache access patterns for prior workloads.

In some embodiments, when selecting a distributed parser 220 to receive a batch, global parser 210 is configured to select a parser 220 that has sufficient queue space to fit the sequence of batches of the size indicated by sequential work indicator 604. In some embodiments, global parser 210 ensures that at least one queue space remains open after sending the sequence of batches.

In some embodiments, global parser 210 may adjust the number of workgroups in a batch (e.g., using a batch size indicator) to fit a sequence of batches into a particular distributed parser's queue. For example, consider a sequence of three batches, each containing ten workgroups and a distributed workload parser 220 with three open queue entries. In order to leave a queue entry open (e.g., to avoid stalls on a kernel terminate), global workload parser 210 may adjust the batch size to fifteen workgroups per batch and transmit the resulting two batches to the distributed workload parser 220.

In some embodiments, the global workload parser 210 is configured to maintain information (e.g., a bit per distributed parser) indicating whether that distributed parser 220 received any batches from the current kernel. In some embodiments, global workload parser 210 is configured to send kernel terminate commands only to distributed parsers 220 that received a batch from the current kernel.

In some embodiments, the distributed workload parsers 220 are configured to implement a similar credited queue mechanism for queues 614 when sending workgroups to shaders 250. Queues 614 are one example of buffer circuitry 330. In the illustrated embodiment, each parser 220 includes a queue credit tracker 612 configured to track the number of available entries in queues 614. In some embodiments, workgroups and kernel terminates take a queue space in a queue 614. In some embodiments, the distributed parsers 220 are configured not to send workgroups that would use the last space in a queue, to prevent stalling on kernel terminates.

In some embodiments, the distributed workload parsers 220 are configured to maintain information (e.g., a bit per shader) that indicates whether any workgroups from the current kernel were sent to that shader 250. In some embodiments, the parsers 220 are configured to send kernel terminate commands only to shaders 250 that received a batch from the current kernel.

Queue size adjustment circuitry 609 is one example of buffer size adjustment circuitry 310 and is configured to adjust the credits available to queue credit tracker 608, queue credit trackers 612, or both, in some embodiments. This adjustment may be based on the complexity of the current kernel, e.g., to reduce buffering at one or more levels for complex kernels. In some embodiments, control circuitry is configured to consider the sequential work indicator 604 when adjusting buffering capabilities. For example, the control circuitry may avoid reducing buffer size below the sequential work size by adjusting the number of available credits, adjusting the sequential work size, or both. In some embodiments, distributed workload parsers may include queue size adjustment circuitry for queues 614 and may receive queue size adjustment information via fabric 230.

Example Method

Figure 7:
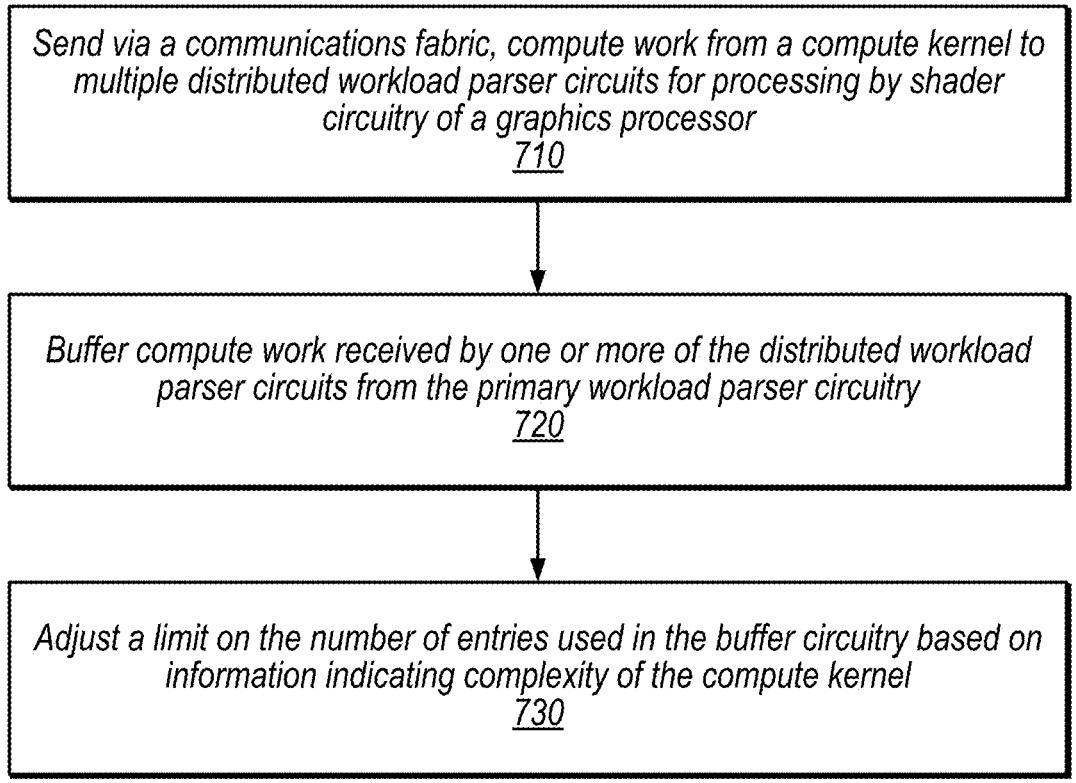
FIG. 7 is a flow diagram illustrating an example method for dynamic buffer adjustment, according to some embodiments.

FIG. 7 is a flow diagram illustrating an example method for dynamic buffering adjustment, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, primary workload parser circuitry of a graphics processor sends, via a communications fabric, compute work from a compute kernel to multiple distributed workload parser circuits for processing by shader circuitry of a graphics processor. In some embodiments, the compute kernel is specified in a compute control stream and the compute control stream includes the information indicating complexity of the compute kernel (e.g., complexity information 412).

At 720, in the illustrated embodiment, buffer circuitry buffers compute work received by one or more of the distributed workload parser circuits from the primary workload parser circuitry. The buffer circuitry may include one or more levels, e.g., buffer circuitry 320, buffer circuitry 330, or both. In some embodiments, the buffer circuitry includes a first entry configured to store a first batch of workgroups from the compute kernel and a second entry configured to store a second batch of workgroups from the compute kernel. In some embodiments, the buffer circuitry includes a first entry configured to store a first workgroup from the compute kernel and a second entry configured to store a second workgroup from the compute kernel. In some embodiments, the buffer circuitry includes first buffer circuitry (e.g., circuitry 320) configured to buffer compute work assigned to a first distributed workload parser circuit by the primary workload parser circuitry and second buffer circuitry (e.g., circuitry 330) configured to buffer compute work assigned to a portion of the shader circuitry by the first distributed workload parser circuit. In some embodiments, the dynamic adjustment limits the number of entries used in both the first and second buffer circuitry. In other embodiments, the dynamic adjustment may limit buffering at a subset of the levels of a multi-level buffering hierarchy.

At 730, in the illustrated embodiment, the graphics processor adjusts a limit on the number of entries used in the buffer circuitry based on information indicating complexity of the compute kernel.

In some embodiments, the graphics processor is configured to adjust limits for entries used in first and second buffer circuitry by different amounts. In some embodiments, the first buffer circuitry is configured to store compute work at a granularity of batches of workgroups and the second buffer circuitry is configured to store compute work at a granularity of workgroups. In some embodiments, the primary workload parser circuitry is configured to communicate, to the distributed workload parser circuits via the fabric, the adjustment of the limit for the second buffer circuitry (e.g., for buffer circuitry 330).

In some embodiments, the graphics processor includes one or more configurable registers whose value indicates an amount of the adjustment to the limit. In some embodiments, the graphics processor is configured to use a credit system in which the primary workload parser circuit is allocated credits based on available entries in the buffer circuitry and the dynamic adjustment reduces the number of credits.

Example Device

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 875 is configured to implement various techniques and circuitry disclosed herein. This may improve performance, reduce power consumption, etc., relative to traditional graphics techniques.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 1B, 2, 3A-3B, 5, 6, and 8. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a graphics processor that includes:
   shader circuitry configured to process compute work from a compute kernel;
   multiple distributed workload parser circuits configured to send compute work to the shader circuitry;
   primary workload parser circuitry configured to send, via a communications fabric, compute work from the compute kernel to the distributed workload parser circuits;
   buffer circuitry configured to buffer compute work, including portions of the compute kernel, received by one or more of the distributed workload parser circuits from the primary workload parser circuitry, wherein the distributed workload parser circuits are configured to provide work from the buffer circuitry to portions of the shader circuitry for execution;
   wherein the graphics processor is configured to dynamically adjust a limit on the number of entries used in the buffer circuitry based on information indicating complexity of the compute kernel, including to reduce the limit on the number of entries for a first compute kernel that is indicated as complex, thereby improving balance of compute work distributed to the portions of the shader circuitry.

2. The apparatus of claim 1, wherein the compute kernel is specified in a compute control stream and wherein the compute control stream includes the information indicating complexity of the compute kernel.

3. The apparatus of claim 1, wherein the buffer circuitry includes a first entry configured to store a first batch of workgroups from the compute kernel and a second entry configured to store a second batch of workgroups from the compute kernel.

4. The apparatus of claim 1, wherein the buffer circuitry includes a first entry configured to store a first workgroup from the compute kernel and a second entry configured to store a second workgroup from the compute kernel.

5. The apparatus of claim 1, wherein the buffer circuitry includes:
   first buffer circuitry configured to buffer compute work assigned to a first distributed workload parser circuit by the primary workload parser circuitry; and
   second buffer circuitry configured to buffer compute work assigned to a portion of the shader circuitry by the first distributed workload parser circuit;
   wherein the dynamic adjustment limits the number of entries used in both the first and second buffer circuitry.

6. The apparatus of claim 5, wherein the graphics processor is configured to adjust limits for entries used in the first and second buffer circuitry by different amounts.

7. The apparatus of claim 5, wherein the primary workload parser circuitry is configured to communicate, to the distributed workload parser circuits via the fabric, the adjustment of the limit for the second buffer circuitry.

8. The apparatus of claim 5, wherein the first buffer circuitry is configured to store compute work at a granularity of batches of workgroups and the second buffer circuitry is configured to store compute work at a granularity of workgroups.

9. The apparatus of claim 1, wherein the graphics processor includes:
   one or more configurable registers whose value indicates an amount of the adjustment to the limit.

10. The apparatus of claim 1, wherein the graphics processor is configured to use a credit system in which the primary workload parser circuit is allocated credits based on available entries in the buffer circuitry and wherein the dynamic adjustment reduces the number of credits.

11. The apparatus of claim 1, wherein the apparatus is a computing device that further includes:
    a central processing unit;
    a display; and
    network interface circuitry.

12. A method, comprising:
    sending, by primary workload parser circuitry via a communications fabric, compute work from a compute kernel to multiple distributed workload parser circuits for processing by shader circuitry of a graphics processor;
    buffering, by buffer circuitry, compute work including portions of the compute kernel received by one or more of the distributed workload parser circuits from the primary workload parser circuitry;
    providing, by the distributed workload parser circuits work from the buffer circuitry to portions of the shader circuitry for execution, and
    adjusting, by the graphics processor, a limit on the number of entries used in the buffer circuitry based on information indicating complexity of the compute kernel, including reducing the limit on the number of entries for a first compute kernel that is indicated as complex, thereby improving balance of compute work distributed to the portions of the shader circuitry.

13. The method of claim 12, wherein the compute kernel is specified in a compute control stream and wherein the compute control stream includes the information indicating complexity of the compute kernel.

14. The method of claim 12, wherein the buffer circuitry includes:
    first buffer circuitry configured to buffer compute work assigned to a first distributed workload parser circuit by the primary workload parser circuitry; and
    second buffer circuitry configured to buffer compute work assigned to a portion of the shader circuitry by the first distributed workload parser circuit;
    wherein the adjusting limits the number of entries used in both the first and second buffer circuitry.

15. The method of claim 12, wherein the graphics processor uses a credit system in which the primary workload parser circuit is allocated credits based on available entries in the buffer circuitry and wherein the adjusting reduces the number of credits.

16. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:

a graphics processor that includes:
- shader circuitry configured to process compute work from a compute kernel;
- multiple distributed workload parser circuits configured to send compute work to the shader circuitry;
- primary workload parser circuitry configured to send, via a communications fabric, compute work from the compute kernel to the distributed workload parser circuits; and
- buffer circuitry configured to buffer compute work, including portions of the compute kernel, received by one or more of the distributed workload parser circuits from the primary workload parser circuitry, wherein the distributed workload parser circuits are configured to provide work from the buffer circuitry to portions of the shader circuitry for execution;
- wherein the graphics processor is configured to dynamically adjust a limit on the number of entries used in the buffer circuitry based on information indicating complexity of the compute kernel, including to reduce the limit on the number of entries for a first compute kernel that is indicated as complex, thereby improving balance of compute work distributed to the portions of the shader circuitry.

17. The non-transitory computer readable storage medium of claim 16, wherein the buffer circuitry includes:
- first buffer circuitry configured to buffer compute work assigned to a first distributed workload parser circuit by the primary workload parser circuitry; and
- second buffer circuitry configured to buffer compute work assigned to a portion of the shader circuitry by the first distributed workload parser circuit;
- wherein the dynamic adjustment limits the number of entries used in both the first and second buffer circuitry.

18. The non-transitory computer readable storage medium of claim 17, wherein the primary workload parser circuitry is configured to communicate, to the distributed workload parser circuits via the fabric, the adjustment of the limit for the second buffer circuitry.

19. The non-transitory computer readable storage medium of claim 17, wherein the first buffer circuitry is configured to store compute work at a granularity of batches of workgroups and the second buffer circuitry is configured to store compute work at a granularity of workgroups.

20. The non-transitory computer readable storage medium of claim 16, wherein the graphics processor is configured to use a credit system in which the primary workload parser circuit is allocated credits based on available entries in the buffer circuitry and wherein the dynamic adjustment reduces the number of credits.

* * * * *